(12) United States Patent
Liu et al.

(10) Patent No.: US 8,756,913 B2
(45) Date of Patent: Jun. 24, 2014

(54) EXHAUST GAS SENSOR MODULE

(75) Inventors: Z. Gerald Liu, Madison, WI (US); Achuth Munnannur, Stoughton, WI (US); Andrew Osburn, Nashville, IN (US); Shashidhar Srinivas, Madison, WI (US); Jason Drost, Edgerton, WI (US); Michael Welp, Oregon, WI (US); Robert Nowicki, Stoughton, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 721 days.

(21) Appl. No.: 13/007,342

(22) Filed: Jan. 14, 2011

(65) Prior Publication Data

US 2012/0180457 A1 Jul. 19, 2012

(51) Int. Cl.
*F01N 11/00* (2006.01)
*G01N 1/24* (2006.01)
*G01N 33/00* (2006.01)

(52) U.S. Cl.
USPC ............... 60/276; 60/274; 60/299; 73/866.5; 73/863; 422/82.01; 422/82.04; 422/83

(58) Field of Classification Search
USPC ........ 60/274, 276, 299; 73/866.5, 863.3, 863; 422/82.01, 82.04, 83
See application file for complete search history.

(56) References Cited

U.S. PATENT DOCUMENTS

| | | | |
|---|---|---|---|
| 4,047,437 A | 9/1977 | Brooks | |
| 5,703,299 A | 12/1997 | Carleton et al. | |
| 6,904,815 B2 | 6/2005 | Widmer | |
| 6,976,397 B2 * | 12/2005 | Widmer | 73/863.03 |
| 7,415,901 B2 * | 8/2008 | Desrochers et al. | 73/863.03 |
| 7,434,448 B2 | 10/2008 | Weyl et al. | |
| 7,587,950 B2 | 9/2009 | Liu et al. | |
| 7,587,951 B2 | 9/2009 | Liu et al. | |
| 8,341,936 B2 * | 1/2013 | Zhang | 60/276 |

(Continued)

FOREIGN PATENT DOCUMENTS

| | | |
|---|---|---|
| DE | 10203310 A1 | 7/2003 |
| DE | 10348175 A1 | 5/2004 |

(Continued)

OTHER PUBLICATIONS

PCT/US2011/021399 International Search Report and Written Opinion mailed Oct. 25, 2011.

(Continued)

*Primary Examiner* — Kenneth Bomberg
*Assistant Examiner* — Brandon Lee
(74) *Attorney, Agent, or Firm* — Foley & Lardner LLP

(57) ABSTRACT

According to one embodiment, a sensor module includes a sensor probe that has at least two arms coupled together at a central location with each of the at least two arms extending radially outwardly away from the central location. Each of the at least two arms includes one of a plurality of openings and an elongate opening extending radially along the arm. The at least two arms define fluid flow channels therein. The sensor module also includes at least one extractor coupled to the probe. The at least one extractor includes a fluid flow channel that is communicable in fluid receiving communication with fluid flowing through the fluid flow channel of at least one of the at least two arms. Further, the sensor module includes at least one sensor that is communicable in fluid sensing communication with fluid flowing through the at least one extractor.

11 Claims, 13 Drawing Sheets

(56) References Cited

U.S. PATENT DOCUMENTS

| | | | |
|---|---|---|---|
| 2004/0099475 A1* | 5/2004 | Schulte | 181/227 |
| 2007/0214862 A1* | 9/2007 | Kubinski et al. | 73/1.06 |
| 2010/0064662 A1* | 3/2010 | Hinz et al. | 60/274 |

FOREIGN PATENT DOCUMENTS

| | | | |
|---|---|---|---|
| EP | 0978721 A1 | 2/2000 | |
| JP | 03-199613 | 8/1991 | |
| JP | 08-291708 | 11/1996 | |
| JP | 2004132766 A | 4/2004 | |
| JP | 2008267232 A | 11/2008 | |
| JP | 2010276549 A | 12/2010 | |

OTHER PUBLICATIONS

European Application No. 13154457.9 Search Report dated May 7, 2013.

* cited by examiner

EXHAUST GAS SENSOR MODULE

FIELD

This disclosure relates to sensing characteristics of a fluid, and more particularly to a fluid sensor module for sensing characteristics of a flowing fluid.

BACKGROUND

Exhaust emissions regulations for internal combustion engines have become more stringent over recent years. For example, the regulated emissions of $NO_x$ and particulates from diesel-powered internal combustion engines are low enough that, in many cases, the emissions levels cannot be met with improved combustion technologies. Therefore, the use of exhaust after-treatment systems on engines to reduce harmful exhaust emissions is increasing. Typical exhaust after-treatment systems include any of various components configured to reduce the level of harmful exhaust emissions present in the exhaust gas. For example, some exhaust after-treatment systems for diesel-powered internal combustion engines include various components, such as a diesel oxidation catalyst (DOC), a particulate matter filter or diesel particulate filter (DPF), and a selective catalytic reduction (SCR) catalyst. In some exhaust after-treatment systems, exhaust gas first passes through the diesel oxidation catalyst, then passes through the diesel particulate filter, and subsequently passes through the SCR catalyst.

Each of the DOC, DPF, and SCR catalyst components is configured to perform a particular exhaust emissions treatment operation on the exhaust gas passing through or over the components. The DOC, DPF, and SCR catalyst each include a catalyst bed or substrate that facilitates the corresponding exhaust emissions treatment operation. Generally, the catalyst bed of the DOC reduces the amount of carbon monoxide and hydrocarbons present in the exhaust gas via oxidation techniques. The substrate of the DPF filters harmful diesel particulate matter and soot present in the exhaust gas. Finally, the catalyst bed of the SCR catalyst reduces the amount of nitrogen oxides ($NO_x$) present in the exhaust gas.

Generally, the catalyst bed of the SCR catalyst is configured to convert $NO_x$ (NO and $NO_2$ in some fraction) to $N_2$ and other compounds. SCR systems utilize a reductant (e.g., diesel exhaust fluid (DEF)) and the SCR catalyst to convert the $NO_x$. In most conventional SCR systems, ammonia is used to reduce $NO_x$. However, due to the undesirability of handling pure ammonia, most systems utilize an alternate compound such as urea, which vaporizes and decomposes to ammonia before entering the SCR catalyst. When just the proper amount and distribution of ammonia is available at the SCR catalyst under the proper conditions, the ammonia reduces $NO_x$ in the presence of the SCR catalyst. Currently available SCR systems can produce high $NO_x$ conversion rates allowing the combustion technologies to focus on power and efficiency. However, currently available SCR systems also suffer from several drawbacks. For example, one known drawback is the inability to effectively provide feedback control of the engine system based on the sensed characteristics of exhaust gas flowing through the SCR system.

Conventional methods for controlling operation of an engine and a reductant doser in an SCR system are based on an open-loop control system. Inputs to the open-loop control system include sensed characteristics of exhaust gas flowing through the system. One or more of the sensed characteristics are compared to a predetermined operating map to obtain an appropriate reductant dosing rate. Typically, the characteristics are sensed at a location upstream of the SCR catalyst of the SCR system. Often, to detect failures or accommodate correction of the map-generated reductant dosing rate, additional characteristics of the exhaust gas sensed at a location downstream of the SCR catatyst can be used. Although a control system employing sensors upstream and downstream of an SCR catalyst provides some benefits, the efficiency and accuracy of the system often suffers with such an arrangement.

Additionally, the design of sensors used in conventional exhaust after-treatment systems for sensing exhaust characteristics often promotes several drawbacks. Typical sensors used in exhaust after-treatment systems are point-measurement devices that sense the concentration of components of the exhaust gas at a single localized point within the exhaust stream. A controller then assigns a component concentration for all the exhaust gas flowing through the system based on the sensed concentration at the localized point. Often, the localized point is at an outer periphery or a center of the exhaust gas stream. In most systems, however, component concentrations within the exhaust gas stream can be poorly spatially distributed. Such poor spatial distribution of components within the exhaust gas can be caused by inadequate mixing of the reductant upstream of the SCR catalyst. Inadequate mixing of reductant upstream of the SCR catalyst can also result in poor distribution of $NO_x$ downstream of the SCR catalyst. Component concentration calculations for the entire exhaust gas stream based on readings taken from malidistributed exhaust glow by point-measurement sensors upstream and downstream of the SCR catalyst may be inaccurate. Inaccurate component concentration calculations may lead to measurement errors and potentially negative effects on the efficiency and longevity of an exhaust after-treatment system, particularly an SCR system.

Further, certain probe-type sensors demand a certain exhaust gas flow rate through the probe and past the sensing device for accurate readings. Often, maintaining an adequate exhaust gas flow rate through the probe under a wide range of operating conditions is difficult.

SUMMARY

The subject matter of the present application has been developed in response to the present state of the art, and in particular, in response to the problems and needs in the fluid sensing art that have not yet been fully solved by currently available sensors and sensing systems. Accordingly, the subject matter of the present application has been developed to provide a fluid sensor module and associated apparatus, systems, and methods for sensing component concentrations in a fluid stream that overcomes at least some shortcomings of the prior art approaches.

According to one embodiment, a sensor module for sensing characteristics of a fluid flowing through a fluid conduit includes a sensor probe that has at least two arms coupled together at a central location with each of the at least two arms extending radially outwardly away from the central location. Each of the at least two arms includes one of a plurality of openings and an elongate opening extending radially along the arm. The at least two arms define fluid flow channels therein. The sensor module also includes at least one extractor coupled to the probe. The at least one extractor includes a fluid flow channel that is communicable in fluid receiving communication with fluid flowing through the fluid flow channel of at least one of the at least two arms. Further, the sensor module includes at least one sensor that is communicable in fluid sensing communication with fluid flowing through the at least one extractor.

In some implementations of the sensor module, the sensor module also includes a suction generating element that is coupled to an outlet of the at least one extractor. The suction generating element can be a conical feature. The sensor module can also include a housing that extends about the at least two arms. The housing can have open ends. Moreover, a radially outer end of each of the at least two arms can be coupled to the housing. In certain implementations, the housing is substantially annular shaped.

According to some implementations of the sensor module, each of the at least two arms includes a plurality of openings that are equally spaced along the respective at least two arms. In other implementations, a distance between each of the plurality of openings decreases in a radially outward direction. In yet further implementations, a size of each of the plurality of openings increases in a radially outward direction. Each of the plurality of openings can be positioned on the arms at a location corresponding with one of a plurality of annular-shaped cross-sectional segments of a fluid flow channel defined by the fluid conduit. In contrast to a plurality of openings, in some implementations, the at least two arms each include an elongate opening that diverges in a radially outward direction.

In certain implementations of the sensor module, the fluid flow channel of the at least one extractor is communicable in fluid receiving communication with fluid flowing through the fluid flow channel of one of the at least two arms via the fluid flow channel of the other of the at least two arms. In other implementations, the sensor probe includes at least a first, second, and third arm. The fluid flow channel of the first arm is communicable in fluid receiving communication with fluid flowing through the fluid flow channels of the second and third arms. Also, the fluid flow channel of the at least one extractor is communicable in fluid receiving communication with fluid flowing through the fluid flow channel of the first arm. The first, second, and third arms can each include the plurality of openings. In certain implementations, a distance between respective openings of the plurality of openings of the first arm is greater than a distance between respective openings of the plurality of openings of the second and third arms.

According to some implementations of the sensor module, the fluid flow channel is defined by a fluid outlet portion of the extractor. The fluid flow channel of the outlet portion of the extractor is substantially parallel to the fluid flow channels of the at least two arms and the fluid outlet portion of the extractor is adjacent the at least two arms. The sensor can be positioned at an intersection between the fluid flow channel of the fluid outlet portion of the extractor and the fluid flow channel of the at least one of the at least two arms from which fluid is receivable by the at least one extractor. The fluid flow channel of the fluid outlet portion of the extractor can be substantially parallel to the fluid flow channels of the at least two arms with the fluid outlet portion being spaced-apart from the at least two arms by a distance greater than a width of a fluid treatment device.

In certain implementations, the sensor module includes at least two extractors each coupled to a respective one of the at least two arms. The fluid flow channels of the at least two extractors are communicable in fluid receiving communication with fluid flowing through the fluid flow channel of the respective one of the at least two arms. The sensor module can include at least two sensors each communicable in fluid sensing communication with fluid flowing through a respective one of the at least two extractors. A first of the at least two sensors can sense a first characteristic of fluid flowing through the extractor associated with the first sensor and a second of the at least two sensors can sense a second characteristic of fluid flowing through the extractor associated with the second sensor.

According to another embodiment, a fluid treatment system includes a housing that defines a fluid flow channel through which fluid is flowable in a fluid flow direction from an inlet of the housing to an outlet of the housing. The system includes a first fluid treatment device that is positioned within the fluid flow channel between the inlet and outlet of the housing. Further, the system includes a second fluid treatment device that is positioned within the fluid flow channel between the first fluid treatment device and the outlet of the housing. Additionally, the system includes at least one sensor module that has a sensor probe positioned within the fluid flow channel between the first and second fluid treatment devices and a plurality of hollow arms extending radially outward from a radially inward portion of the fluid flow channel to a radially outward portion of the fluid flow channel. Each of the plurality of arms includes a plurality of apertures facing a direction substantially opposite the fluid flow direction. The apertures are communicable in fluid receiving communication with a sample portion of fluid flowing through the fluid flow channel. The sensor module further includes at least one sensor communicable in sensing communication with fluid received through the apertures.

In some implementations of the system, fluid received through the apertures of at least one of the plurality of hollow arms flows through the at least one hollow arm and combines with fluid received through the apertures of and flowing through at least another of the plurality of hollow arms. The at least one sensor can be communicable in sensing communication with the combined fluid flowing through the at least another of the plurality of hollow arms. The plurality of apertures of each of the hollow arms can be aligned along the respective hollow arm from a radially innermost portion of the hollow arm to a radially outermost portion of the hollow arm.

The system can include a first sensor module and a second sensor module. The first sensor module can be positioned between the first and second fluid treatment devices and the second sensor module can be positioned within the fluid flow channel between the second fluid treatment device and the outlet of the housing. The first fluid treatment device can be a first portion or half of a selective catalytic reduction (SCR) catalyst and the second fluid treatment device can be a second portion or half of an SCR catalyst. The fluid can be an exhaust gas generated by an internal combustion engine. Further, the at least one sensor of the first sensor module can sense an ammonia concentration in the exhaust gas received through the apertures of the sensor probe of the first sensor module, and the at least one sensor of the second sensor module can sense a nitrogen-oxide concentration in the exhaust gas received through the apertures of the sensor probe of the second sensor module. The system can include an engine control unit that is operable to control operations of the internal combustion engine. The sensor can be communicable in electronic communication with an engine control unit to forward at least one characteristic of the fluid flowing between the first and second fluid treatment devices for facilitating closed-loop feedback control of the internal combustion engine.

In some implementations of the system, the at least one sensor module includes an extractor portion coupled to the sensor probe. The extractor portion can include the sensor. Moreover, the extractor portion can be communicable in fluid receiving communication with the plurality of hollow arms of the sensor probe. The extractor portion can further include an outlet positioned between the first and second fluid treatment devices. The outlet of the extractor portion can be communicable in fluid supplying communication with fluid flowing through the fluid flow channel of the housing. The extractor portion can include a pressure regulating element that facilitates a fluid pressure at the outlet of the extractor portion that is lower than a fluid pressure at the plurality of apertures of the plurality of arms. In alternative implementations, the outlet is positioned between the second fluid treatment device and the outlet of the housing such that the outlet of the extractor portion being communicable in fluid supplying communication with fluid flowing through the fluid flow channel of the housing. In these latter implementations, the extractor portion can include a bypass line that extends about and/or through the second fluid treatment device where the bypass line fluidly couples the sensor probe and the outlet of the extractor portion.

In yet another embodiment, a method for sensing characteristics of a fluid flowing through a fluid conduit includes positioning a sensor module at least partially within the fluid conduit. The sensor module includes a plurality of hollow arms that each has a plurality of radially-aligned apertures collectively defining an inlet of the sensor module. Further, the sensor module includes at least one fluid extractor coupled to the plurality of arms. The at least one fluid extractor can include an outlet of the sensor module. The method also includes creating a pressure differential between the inlet and outlet of the sensor module. Additionally, the method includes entraining a portion of the fluid flowing through the fluid conduit into the plurality of apertures, through the plurality of hollow arms, and through the fluid extractor via the created pressure differential. The method further includes sensing at least one characteristic of the portion of fluid flowing through fluid extractor.

In some implementations, entraining a portion of the fluid flowing through the fluid conduit and through the plurality of hollow arms includes combining fluid flow through all but one of the plurality of arms into the one of the plurality of arms. The method may further include directing the combined fluid flow through the one of the plurality of arms into the at least one fluid extractor.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment, " "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Furthermore, the described features, structures, or characteristics of the subject matter described herein may be combined in any suitable manner in one or more embodiments. In the following description, numerous specific details are provided, such as examples of controls, structures, devices, algorithms, programming, software modules, user selections, hardware modules, hardware circuits, hardware chips, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

Figure 1:
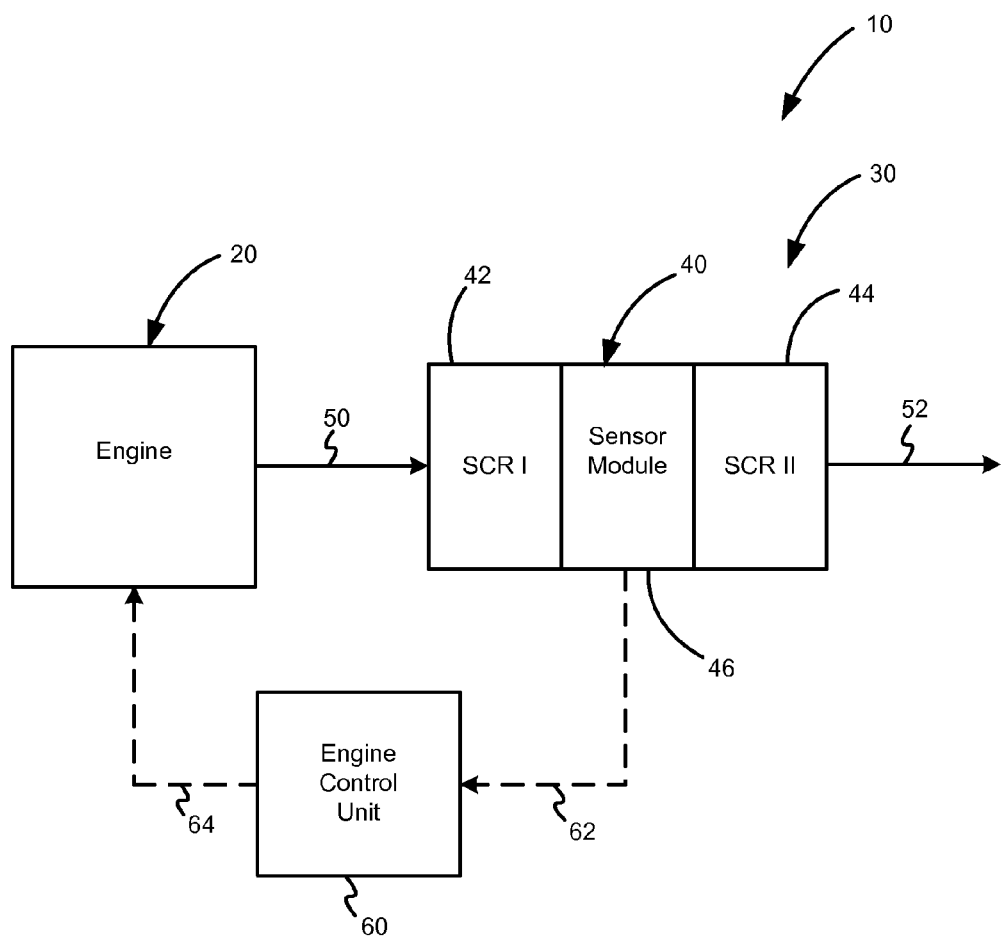
FIG. 1 is a schematic block diagram of an internal combustion engine system having an engine, exhaust gas aftertreatment system, and an engine control unit according to one representative embodiment.

FIG. 1 depicts one embodiment of an internal combustion engine system 10. The main components of the engine system 10 include an internal combustion engine 20 and an exhaust gas after-treatment system 30 coupled to the engine. The internal combustion engine 20 can be a compression ignited internal combustion engine, such as a diesel-powered engine. Within the internal combustion engine 20, the air from the atmosphere is combined with fuel to power the engine. Combustion of the fuel and air produces exhaust gas. At least a portion of the exhaust gas generated by the internal combustion engine 20 is operatively vented to the exhaust gas after-treatment system 30 as indicated by directional arrow 50.

Generally, the exhaust gas after-treatment system 30 is configured to remove various chemical compound and particulate emissions present in the exhaust gas received from the engine 110. The exhaust gas after-treatment system 30 can include any of various exhaust treatment devices, such as diesel oxidation catalysts, diesel particulate filters, and SCR systems. Although the exhaust gas after-treatment system 30 may include one or more other devices or systems, in the illustrated embodiment, only an SCR system 40 is shown. In exhaust flow direction 50, exhaust flows from the engine 20 and through the SCR system 40 before exiting the SCR system as indicated by directional arrow 52.

The SCR system 40 includes an SCR catalyst device with a first SCR catalyst bed, substrate, or brick 42 upstream of a second SCR catalyst bed, substrate, or brick 44. In other words, the SCR system 40 includes an upstream SCR catalyst bed 42 and a downstream SCR catalyst bed 44. The SCR system 40 further includes a sensor module 46 positioned between the upstream and downstream SCR catalyst beds 42, 44. Although not shown, the SCR system 40 includes a reductant delivery system upstream of the upstream SCR catalyst bed 42. The reductant delivery system is operable to inject or dose a reductant into the exhaust gas prior to the gas entering the SCR catalyst beds 42, 44. The injected reductant (or broken-down byproducts of the reductant, such as when urea is reduced to form ammonia) reacts with $NO_x$ in the presence of the SCR catalyst to reduce $NO_x$ in the exhaust gas to less harmful emissions, such as $N_2$ and $H_2O$. The SCR catalyst beds 42, 44 can be any of various catalysts known in the art. For example, in some implementations, the SCR catalyst beds 42, 44 each is a vanadium-based catalyst, and in other implementations, the SCR catalyst beds each is a zeolite-based catalyst, such as a Cu-Zeolite or a Fe-Zeolite catalyst.

The SCR system 40 further includes a sensor module 46 that receives exhaust gas from the upstream SCR catalyst bed 42 and senses a component (e.g., species) concentration in the exhaust gas before the exhaust gas flows into the downstream catalyst bed 44. In certain implementations, the SCR system 40 includes a single housing that housing the upstream SCR catalyst bed 42, downstream SCR catalyst bed 44, and sensor module 46. The component concentration reading or measurement is communicated over a communication line 62 to an engine control unit 60 that calculates a component concentration of the entire exhaust gas flow using an averaging technique based on the component concentration reading. In certain implementations, the engine control unit 60 is an exhaust after-treatment or SCR system control module electrically coupled to an engine control module.

The calculated component concentration is used to control the operating conditions of the engine 20 and/or dosing of the reductant via a communication line 64 to achieve a desired $NO_x$ reduction efficiency, fuel efficiency, and ammonia slip reduction. For example, in some implementations, the calculated component concentration is used to generate a reductant dosing rate command from one or more predetermined maps. Alternatively, or additionally, the calculated component concentration can be used to detect failure of the SCR catalyst bed 42 and/or provide feedback correction of a dosing rate command. In such a mid-bed correction configuration, the sensor module 46 can effectively replace both a traditional sensor placed upstream of the SCR catalyst for reductant dosing rate determination purposes and a traditional sensor placed downstream of the SCR catalyst for on-board diagnostics (OBD) and correction purposes.

The spatial distribution of reductant and $NO_x$ at the inlet of the upstream SCR catalyst bed 42 affects the efficiency of the reduction of $NO_x$ by the upstream and downstream SCR catalyst beds 42, 44. Moreover, the distribution of reductant and $NO_x$ can be highly non-uniform and can vary significantly over an engine operating period. Non-uniformity of the spatial distribution of reductant and $NO_x$ at the inlet of the SCR catalyst bed 42 often translates into non-uniformity of the spatial distribution of reductant and $NO_x$ at the outlet of the SCR catalyst bed 42 and at the sampling location of the sensor module 46. Such spatial distribution non-uniformity typically is exhibited throughout the SCR system 40, including at the inlet and outlet of the second SCR catalyst bed 44. Because of the possibility of non-uniform reductant and $NO_x$ spatial distribution between the first and second SCR catalyst beds 42, 44, the sensor module 46 is configured to capture a sample of the exhaust gas exiting the first SCR catalyst bed that more accurately represents the component characteristics of the entire exhaust gas compared to conventional probe-type sensors. In this manner, the sensor module 46 promotes accurate control of the reductant dosing system, efficient reduction of $NO_x$ by the SCR system 40, an increase in fuel efficiency, and a decrease in ammonia slip.

Figure 2:
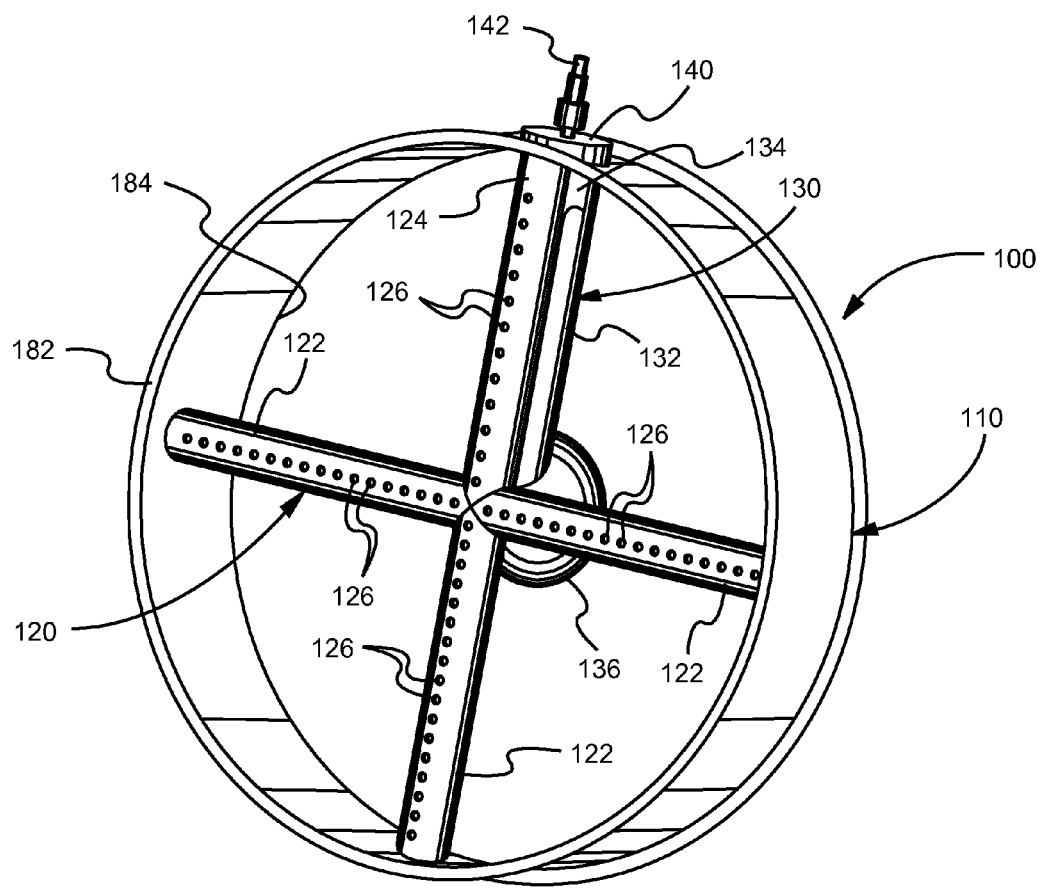
FIG. 2 is a frontal perspective view of a non-bypass fluid sensor module according to one embodiment.

According to one embodiment, the sensor module 46 can be a sensor module 100 as shown in FIG. 2. In other words, the sensor module 100 can be positionable between two SCR catalyst beds, such as SCR catalyst beds 42, 44 in the same or similar manner as sensor module 46. The sensor module 100 includes a base 110 that supports a probe 120 and an extractor 130. In addition to supporting the probe 120 and extractor 130, the base 110 is configured to be coupleable to a housing of a fluid treatment device, such as the housing of an exhaust after-treatment device (see FIG. 6). The base 110 defines a fluid channel 180 extending between an inlet or upstream end 182 and outlet or downstream end 184 of the base. The fluid channel 180 receives fluid through the inlet end 182, which exits the fluid channel through the outlet end 184. In certain implementations, such as those in which the housing houses a fluid treatment device, the housing for a fluid treatment device is has a circular cross-section. To accommodate such circular housings, the base 110 is substantially annular shaped. However, in other implementations, the shape of the base 110 can be any of various shapes to accommodate any of various housing shapes. The base 110 includes a sensor receptacle or boss 140 to secure a sensor 142 in a sensing position within the extractor 130. In some embodiments, the extractor 130 includes multiple sensors 142 each configured to sense the same or different fluid characteristics.

The probe 120 is attached to an interior surface of the base 110 such that the base encircles, encompasses, envelopes, or otherwise extends about the probe 120. In this manner, the probe 120 is positioned within the fluid channel 180 of the base 110 between the inlet and outlet ends 182, 184. The probe 120 includes a plurality of arms or spokes 122, 124 each extending radially outward from a central portion 186 of the probe. More specifically, each of the plurality of arms 122, 124 includes a radially inward end 188 located at the central portion 186 and a radially outward end 189 located at the base 110 (see, e.g., FIG. 3). The radially inward ends 188 of the plurality of arms 122, 124 are coupled to each other at the central portion 186 and the radially outward ends 189 are secured to the interior surface of the base 110. The arms 122 are defined as single fluid flow collection arms and the arm 124 is defined as an aggregate fluid flow collection arm. Generally, fluid entering the single fluid flow collection arms 122 flows into and combines with fluid entering and flowing through the aggregate fluid flow collection arm 124.

Figure 10:
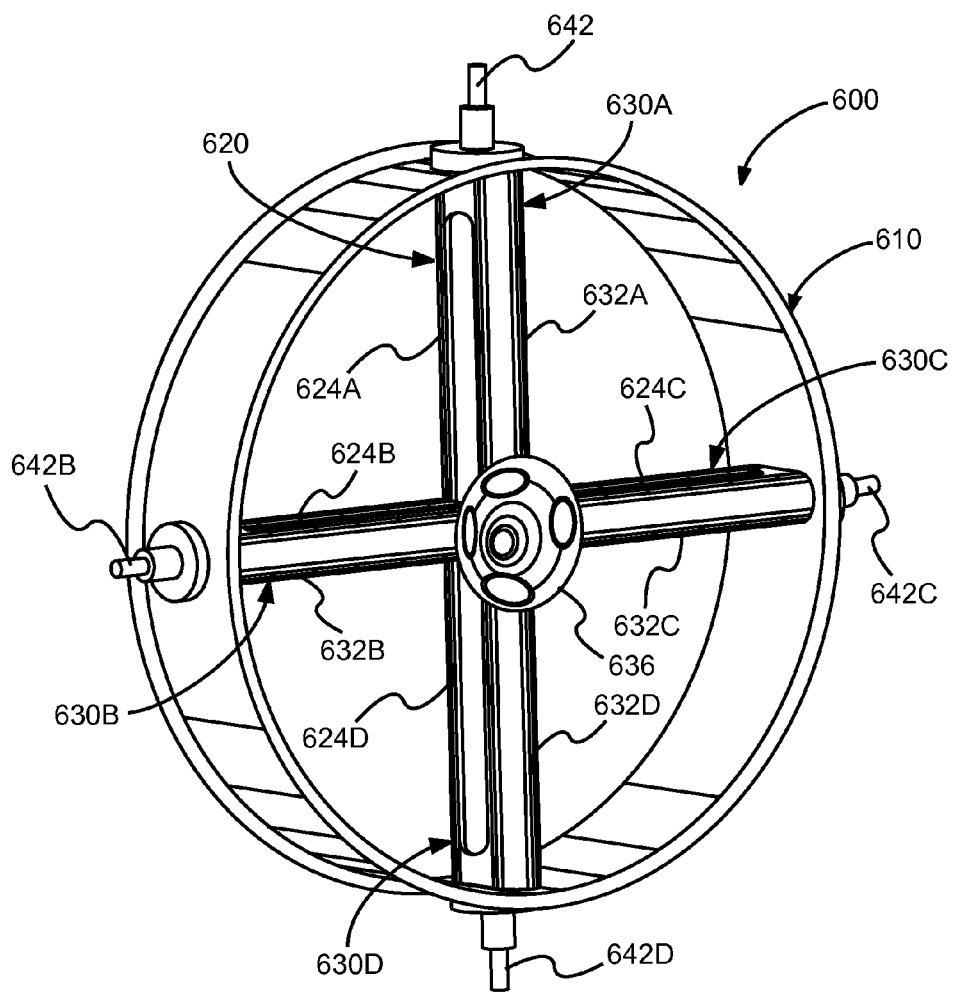
FIG. 10 is a rearward perspective view of a non-bypass fluid sensor module having multiple extractor portions according to one embodiment.

Although the illustrated probe 120 includes one aggregate fluid flow collection arm 124 and multiple single fluid flow collection arms 122, in other embodiments, the probe 120 can include multiple aggregate fluid flow collections arms 124 or no aggregate fluid flow collection arms (see, e.g., FIG. 10). In the illustrated embodiment of FIG. 2, the probe 120 includes four arms equally angularly-spaced apart from each other. However, in other embodiments, the probe 120 can include fewer or more than four arms, with the arms being equally angularly-spaced apart from each other or with different angular intervals between the arms.

Figure 3:
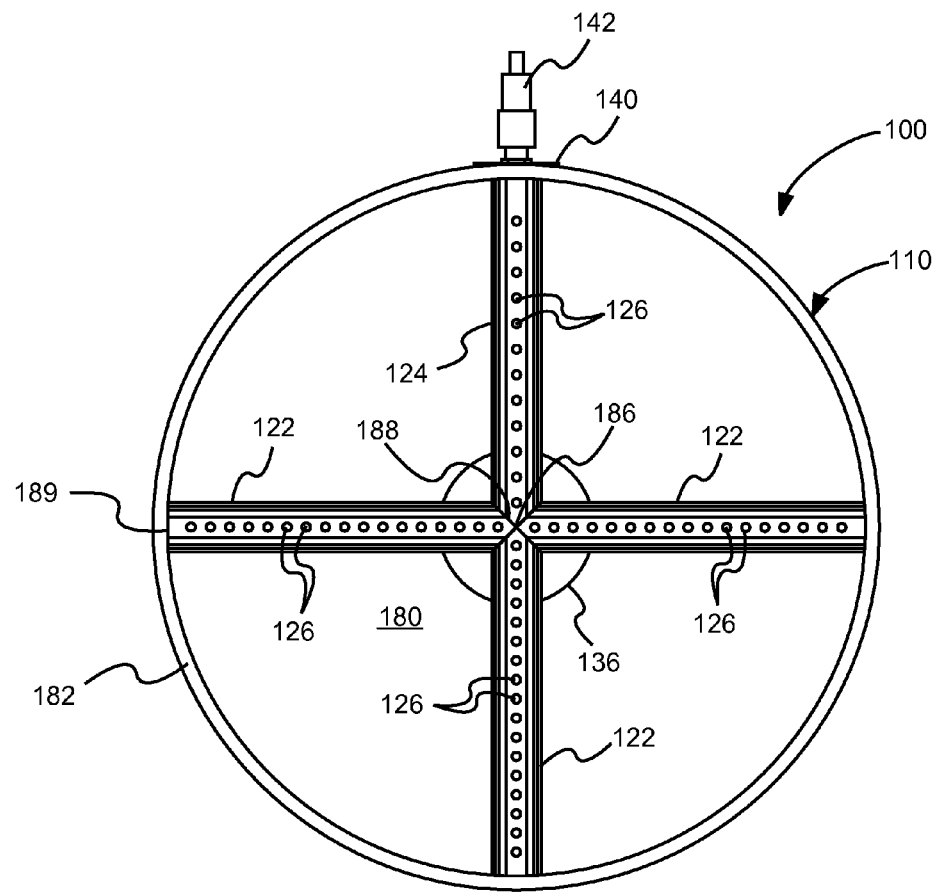
FIG. 3 is a front view of the fluid sensor module of FIG. 2.
Figure 5:
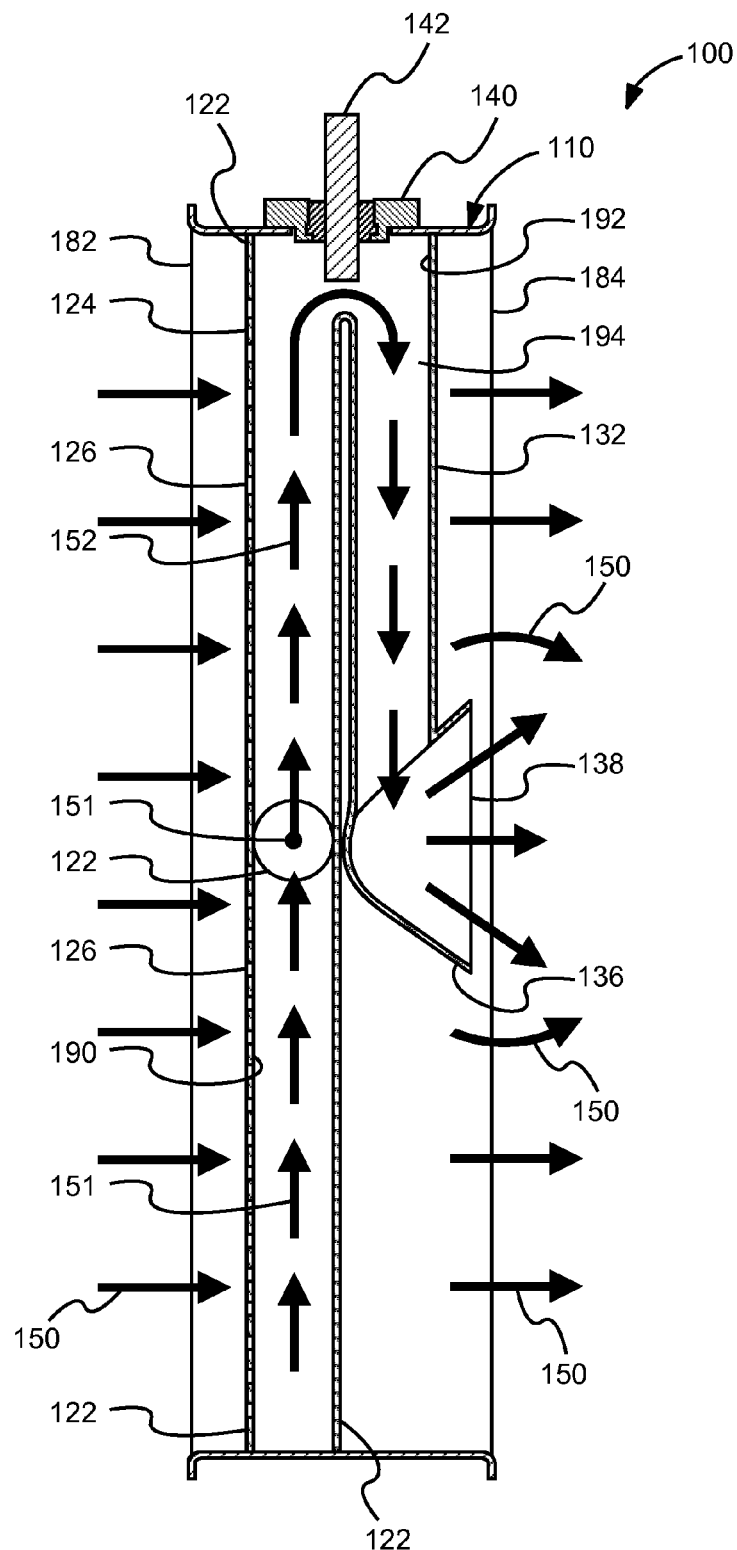
FIG. 5 is a cross-sectional side view of the fluid sensor module of FIG. 2.

The arms 122, 124 of the probe 120 each is substantially hollow to define a fluid flow channel 190 (see FIG. 5). The fluid flow channel 190 of each arm can have any of various cross-sectional shapes, such as, for example, circular, elliptical, triangular, polygonal, and the like. Moreover, as shown in FIGS. 2 and 3, the arms 122, 124 each include a set of apertures or openings 126 through which a portion of a main fluid flows before entering the fluid flow channels 190 of the arms. The apertures 126 are formed in respective upstream facing surfaces of the arms 122, 124 such that each of the apertures faces an upstream direction (i.e., normal to a fluid flow direction). Further, the apertures 126 of a respective arm 122, 124 are radially aligned along the respective arm from a location near or proximate the radially inward end 188 of the arm to a location near or proximate the radially outward end 189 of the arm. In the illustrated embodiment, each arm 122 includes seventeen apertures 126 and the arm 124 includes twelve apertures 126. However, in other embodiments, each arm 122 may include fewer or more than seventeen apertures 126 and the arm 124 may include fewer or more than twelve apertures. In certain implementations, each arm 122, 124 includes at least five apertures 126. As shown, the apertures 126 are substantially circular-shaped. However, in other embodiment, the apertures 126 can have other shapes, such as polygonal, elliptical, rectangular, triangular, and the like.

According to the illustrated embodiment of the probe 120, the respective apertures 126 of the single fluid flow arms 122 are equally sized and equally spaced apart from each other. Similarly, the apertures 126 of the aggregate fluid flow arm 124 are equally sized and equally spaced apart from each other. Although the size of the apertures 126 on the arms 122, 124 is the same in the illustrated embodiment, the distance between respective apertures 126 on the single fluid flow arms 122 and the aggregate fluid flow arm 124 is not the same. For example, the distance between respective apertures 126 on the aggregate fluid flow arm 124 is less than the distance between the respective apertures on each single fluid flow arm 122. More specifically, because of the increased distance between the apertures 126 and decreased number of apertures on the aggregate fluid flow arm 124, less fluid mass is driven through the apertures and into the channels 190 of the aggregate fluid flow arm than each single fluid flow arm 122 to accommodate the additional fluid mass received from the single fluid flow arms and to allow for proportional sampling.

The channels 190 of each arm 122, 124 can have any of various hydraulic diameters. In some embodiments, the channels 190 have a hydraulic diameter between about 0.25 inches and 2 inches (e.g., between about 0.25 inches and 0.75 inches in some implementations). In one specific implementation, and as one example, the arms 122, 124 each defines an approximately one-inch hydraulic diameter channel 190 and the apertures 126 formed in the arms each has an approximately 4.75 mm diameter. Because the size of the arms 122, 124 is relatively small compared to the size of the fluid channel 180 of the base 110, the sensor module 100 is minimally intrusive or obstructive (i.e., reduces the effect of the sensor module on the spatial distribution of fluid flow velocity and species).

Preferably, the sensor module 100 is configured to take and test a sample of a main fluid flow with characteristics (e.g., species concentrations) that accurately represent the characteristics of the main fluid flow. Accordingly, the sensor module 100 accounts for the possibility of non-uniform fluid distribution patterns (i.e., non-uniform species mass fraction distribution) across a cross-section of a fluid stream flowing through a conduit by taking multiple samples of the fluid along multiple radially-spaced annular segments of the fluid stream.

Referring back to FIG. 2, the extractor 130 receives fluid from the probe 120, introduces the received fluid to a sensing device, such as the sensor 142, and expels the received fluid back into a main fluid stream. The extractor 130 includes a fluid outlet line 132 and a fluid sampling line 134. The fluid outlet line 132 is in fluid receiving communication with fluid in the probe 120 via the fluid sampling line 134. Each of the fluid outlet and sampling lines 132, 134 define a fluid channel 192 through which fluid is flowable (see, e.g., FIG. 5). Additionally, the fluid sampling line 134 defines a fluid sampling space or collection zone 194 (see, e.g., FIG. 5) in which fluid flowing through the fluid sampling line collects and in which the sensor 142 is positioned. The fluid sampling space 194 can simply be a defined section of the fluid sampling space conduit and/or a collection chamber adjacent the conduit (e.g., collection chamber 736 of FIG. 11). Generally, the sensor 142 is configured to sense or measure the concentration of specific species or components in the fluid collected within the fluid sampling space.

Figure 4:
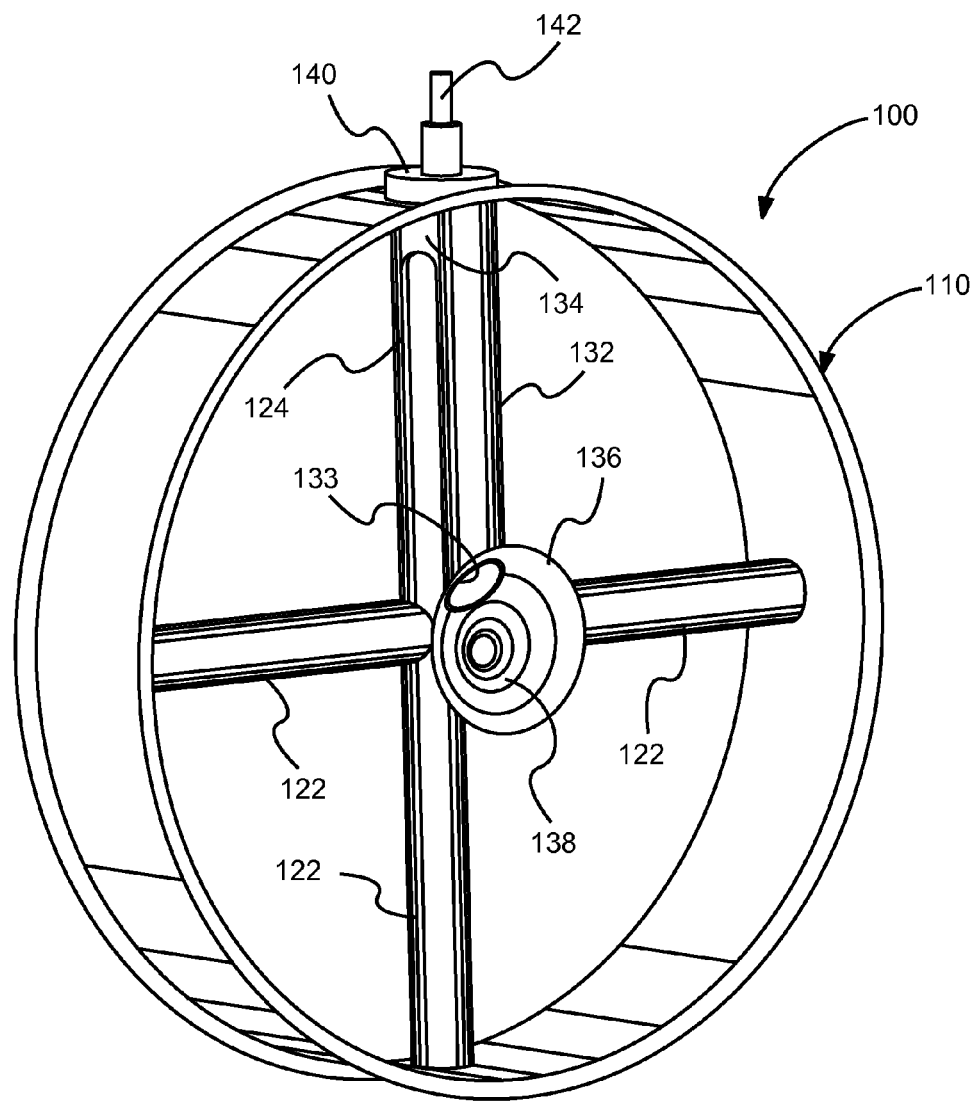
FIG. 4 is a rearward perspective view of the fluid sensor module of FIG. 2.

As shown in FIGS. 2-4, the extractor 130 further includes a negative pressure inducing feature at an outlet of the fluid outlet line 132. The negative pressure inducing feature creates a lower fluid pressure just downstream of the outlet of the fluid outlet line 132 compared to the fluid pressure at the apertures 126 of the probe. This induced positive pressure differential effectively drives a portion of the main fluid stream through the apertures 126 in the arms 122, 124 and through the extractor 130. The negative pressure inducing feature of the extractor 130 is a diffuser cone 136 positioned just downstream of the central portion 186 of the probe 120. An outlet 133 of the fluid outlet line 132 is formed in the diffuse cone 136 (see FIG. 4). In other embodiments, the diffuser cone 136 can be positioned at any of various locations relative to the central portion 186 of the probe 120.

The diffuser cone 136 is a passive negative pressure inducing feature. Other passive negative pressure inducing features can be used, such as restriction devices and venturi-aspirator type arrangements. Alternatively, or additionally, the negative pressure inducing feature can be an active feature, such as a pump. In certain implementations, such as for applications having a convergent outlet pipe section downstream of a fluid treatment device, the fluid outlet line 132 of the sensor module 100 includes an extension that terminates at an inlet of the outlet pipe section instead of a pressure inducing feature. Such implementations take advantage of the low pressure conditions developed at the inlet of a convergent pipe section to create the positive pressure differential.

As shown in FIG. 5, in operation, the sensor module 100 receives a main fluid flow stream 150 through the inlet end 182 of the fluid channel 180. The main fluid flow stream flows in a main fluid flow direction indicated by the directional arrows 150. The main fluid flow stream flows over the arms 122, 124 and a portion of the main fluid flow stream is redirected about the diffuser cone 136 as indicated. The redirection of the main fluid flow stream about the diffuser cone 136 creates a negative or lower pressure proximate an outlet 138 of the cone. The negative pressure creates a positive pressure differential across the sensor probe 120 and extractor 130, which acts to entrain or drive a portion of the main fluid flow stream 150 to enter the apertures 126 of the arms 122, 124. Because the positive pressure differential is maintained across the sensor probe 120 and extractor 130, the fluid is substantially iso-kinetically driven through the plurality of apertures 126. The size, shape, and number of apertures, as well as the configuration of the negative pressure inducing feature, can be selected to drive a desired portion of the main fluid stream at a desired velocity through the apertures and probe. In certain implementations associated with internal combustion engines, the configuration of the apertures is based on the typical duty cycles of the engine, exhaust gas velocity, and/or other similar factors. In one specific embodiment, for example, the apertures and negative pressure inducing feature are configured to drive between about 0.5% to about 3% of the main fluid stream into the apertures at a velocity sufficient for the extracted portion of fluid to pass through the sensor module 100 in less than about one second.

After passing through the apertures 126, the positive pressure differential continues to drive the entrained portion (i.e., sample portion) of the main fluid flow stream through the fluid flow conduits 190. The sample portion flows through the fluid flow conduits 190 of the single fluid flow arms 122 in a radially inward direction 151 and through the fluid flow conduit 190 of the aggregate fluid flow arm 124 in a radial outward direction 152. The sample portion flowing through the flow conduit 190 of the single fluid flow arms 122 combines with the sample portion flowing through the flow conduit of the aggregate fluid flow arm at the central portion 186 of the probe 120 (e.g., the intersection of the radially inward ends 188 of the arms 122, 124).

The combined fluid flows from the aggregate fluid flow arm 124 into the fluid sampling line 134 of the extractor 130. All or a portion of the combined fluid flow passes into or through the sampling space 194 of the fluid sampling line 134. The sensor 142 takes measurements of the fluid within the sampling space 194. After flowing through the fluid sampling line 134, the fluid enters and flows through the fluid flow channel 192 defined by the fluid outlet line 132. From the fluid outlet line 132, the fluid exits the sensor module 100 through the diffuser cone 136 to rejoin the main fluid stream 150. As illustrated, the fluid flow channel 192 and sampling space 194 have a substantially circular-shaped cross-section. However, in other embodiments, the fluid flow channel 192 and sampling space 194 of the extractor 130 can have any of various cross-sectional shapes, such as, for example, circular, elliptical, triangular, polygonal, and the like. The fluid flow channel 192 has any of various hydraulic diameters, such as, for example, between about 0.25 inches and about one inch.

In certain embodiments, to conserve space and material, the fluid outlet line 132 is adjacent the aggregate fluid flow arm 124. Accordingly, the fluid sampling line 134 forms a sharp elbow between the aggregate fluid flow arm 124 and fluid outlet line 132. More specifically, in certain implementations, the fluid sampling line 134 defines a 180-degree coupling between the aggregate fluid flow arm 124 and fluid outlet line 132. In other words, the fluid sampling line 134 redirects the fluid flowing in the radial outward direction in the fluid flow channel 190 into a radial inward direction in the fluid flow channel 192. In this manner, fluid flows through the aggregate fluid flow arm 124 in a direction opposite the flow of fluid through the fluid outlet line 132.

Figure 6:
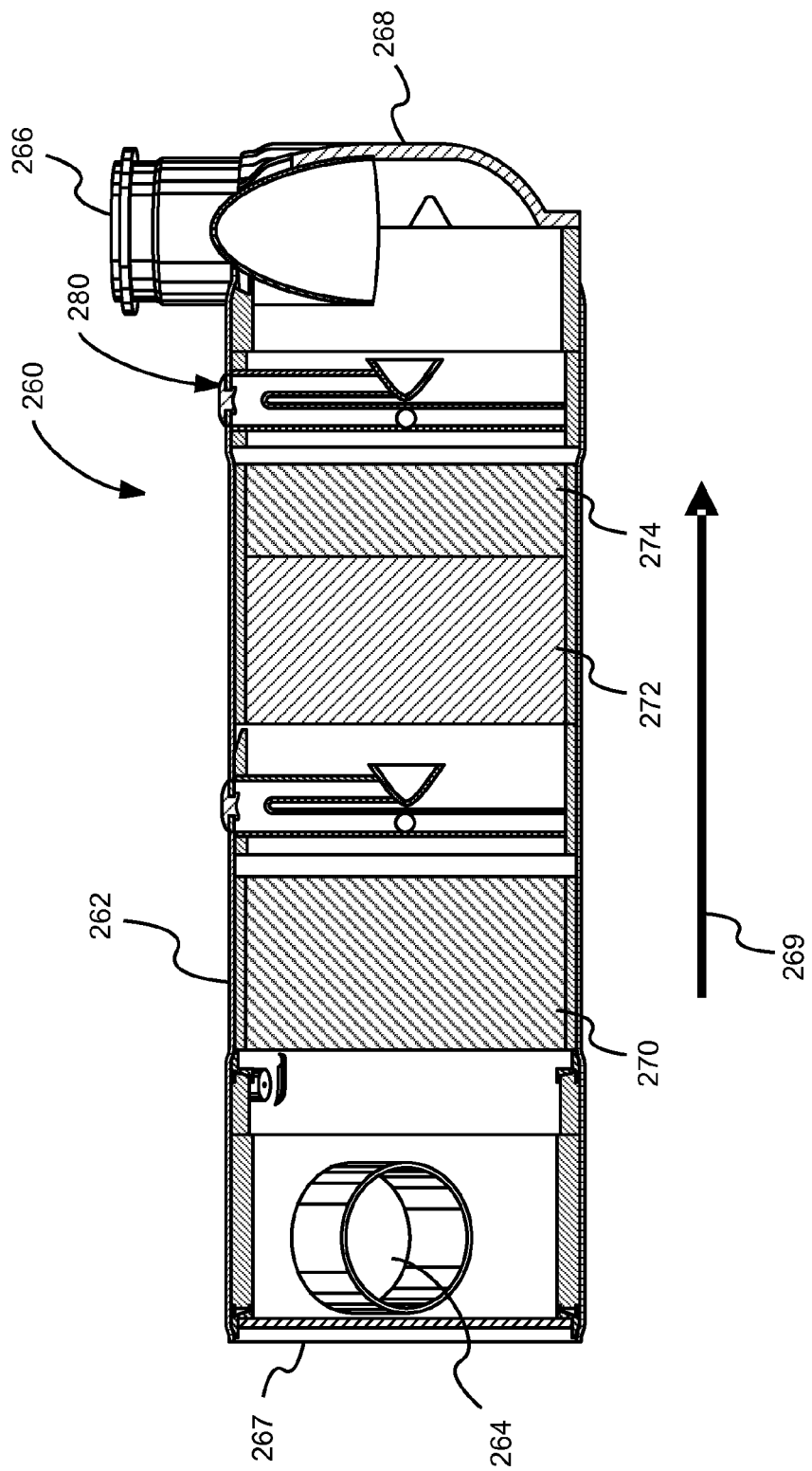
FIG. 6 is a cross-sectional side view of an SCR system having a non-bypass fluid sensor module according to one embodiment.

Sensor modules as described herein can be used in any of various fluid flow applications for sensing the characteristics of the fluid. In one embodiment, as shown in FIG. 6, a sensor module 200 similar to the sensor module 100 is utilized in an exhaust after-treatment system to sense the characteristics of exhaust flowing through the system. The illustrated exhaust after-treatment system is an SCR system 260 that includes a housing 262 within which an upstream SCR catalyst bed 270, a downstream SCR catalyst bed 272, and an ammonia oxidation (AMOX) catalyst bed 274 are housed. The housing 262 is substantially cylindrically shaped with an exhaust inlet 264 and an exhaust outlet 266. In operation, exhaust gas enters the housing through the inlet 264, flows from an upstream end 267 of the housing to a downstream end 268 in an exhaust gas flow direction 269, and exits the housing through the outlet 266. As the exhaust gas flows through the housing, the entirety of the exhaust gas stream flows through the upstream SCR catalyst bed 270, the downstream SCR catalyst bed 272, and the ammonia oxidation (AMOX) catalyst bed 274. Each of the catalyst beds 270, 272, 274 performs a specific emissions reduction operation on the exhaust gas as it passes through the beds.

The upstream and downstream catalyst beds 270, 272 define first and second portions or bricks (e.g., separate halves) of an SCR catalyst. Traditionally, the housing of an SCR system of an individual exhaust line houses a single SCR catalyst with a monolithic, one-piece catalyst bed. In the illustrated embodiment, however, the traditional SCR catalyst has been divided into two separate and spaced-apart portions (i.e., the upstream and downstream SCR catalyst beds 270, 272). The AMOX catalyst 274 in the illustrated embodiment is coupled to (e.g., integrated with) the downstream SCR catalyst bed 272. However, in certain other embodiments, the SCR system 260 does not have an AMOX catalyst, or has an AMOX catalyst that is separate from the downstream SCR catalyst bed 272. In one specific implementation as an example, the upstream and downstream SCR catalyst beds 270, 272 each have an approximately 13-inch diameter and 6-inch axial length. If present, the AMOX catalyst 274 can have an approximately 13-inch diameter and 3-inch axial length. Of course, in other implementations, the SCR catalyst beds 270, 272 and AMOX catalyst 274 can have any of various other sizes and shapes.

The space defined within the housing 262 between the upstream and downstream SCR catalyst beds 270, 272 is occupied by the sensor module 200. The sensor module 200 can be coupled to the housing 262 using any of various techniques. In the illustrated embodiment, the base of the sensor module 200 is secured to an interior surface of the housing 262 using a coupling technique, such as one or more of an adhering, a fastening, or a welding technique. In alternative embodiments, the base of the sensor module 200 is coupled to two separate housing portions in an end-to-end configuration to couple the housing portions together. In the later approach, the base of the sensor module 200 defines an outer wall of the housing 262.

Similar to the operation of sensor modules 46, 100 as described above, the sensor module 200 entrains a portion of the exhaust gas stream flowing from the outlet of the first SCR catalyst bed 270 and senses characteristics of the entrained portion of exhaust gas before reintroducing the entrained portion of exhaust gas back into the exhaust gas stream. The sensed characteristics are reported to an engine control unit or reductant dosing controller (not shown) for precise and accurate control of the reductant dosing characteristics of the SCR system 260. In this manner, the sensor module 200 provides mid-bed reductant dosing control and/or correction capabilities without the need for an upstream static mixer and mixing tube to mix and evenly distribute the exhaust gas prior to sensing the exhaust gas.

Optionally, the SCR system 260 includes a second sensor module 280 similar to the first sensor module 200, but positioned downstream of the second SCR catalyst bed 272. The SCR system 260 includes a second space defined within the housing 262 between the downstream SCR catalyst bed 272 and the downstream end 268 of the housing. The second sensor module 280 is positioned within the second space. Like the first sensor module 200, the second sensor module 280 entrains a portion of the exhaust gas stream flowing from the outlet of the second SCR catalyst bed 272 or AMOX catalyst bed 274, and senses characteristics of the entrained portion. The sensed characteristics are reported to an engine control unit, or exhaust after-treatment controller, for controlling operation of the exhaust after-treatment system. In one embodiment, the first sensor module 200 is configured to measure a concentration of ammonia in the exhaust gas exiting the first SCR catalyst bed 270. More specifically, the sensor of the first sensor module 200 is an ammonia concentration sensor. The second sensor module 280 can be configured to measure a concentration of $NO_x$ in the exhaust gas exiting the second SCR catalyst bed 272. More specifically, the sensor of the second sensor module 280 is a $NO_x$ concentration sensor.

The aperture configuration of the sensor module 100 described above exemplifies one particular type of aperture configuration (i.e., equal-distanced and equal-sized apertures). In other embodiments, the aperture configuration can be different to facilitate equal area sampling of the fluid stream. Equal area sampling is facilitated by dividing a cross-section of the main fluid flow through the sensor module into N sections of equal area. For circular fluid channels, the main fluid flow is divided into a single central circular section with N−1 annular sections. Equal area sampling is achieved by forming each of the plurality of apertures of a respective arm at a location on the arm corresponding with a point within a respective one of the annular sections. In one embodiment using a tangential method, the points within the annular sections are associated with a midpoint of the annular sections. In another embodiment using other methods, such as a log-linear or log-chebyshev method, the points within the annular sections are associated with a center of a pre-defined fluid velocity distribution within the annular sections.

Figure 7:
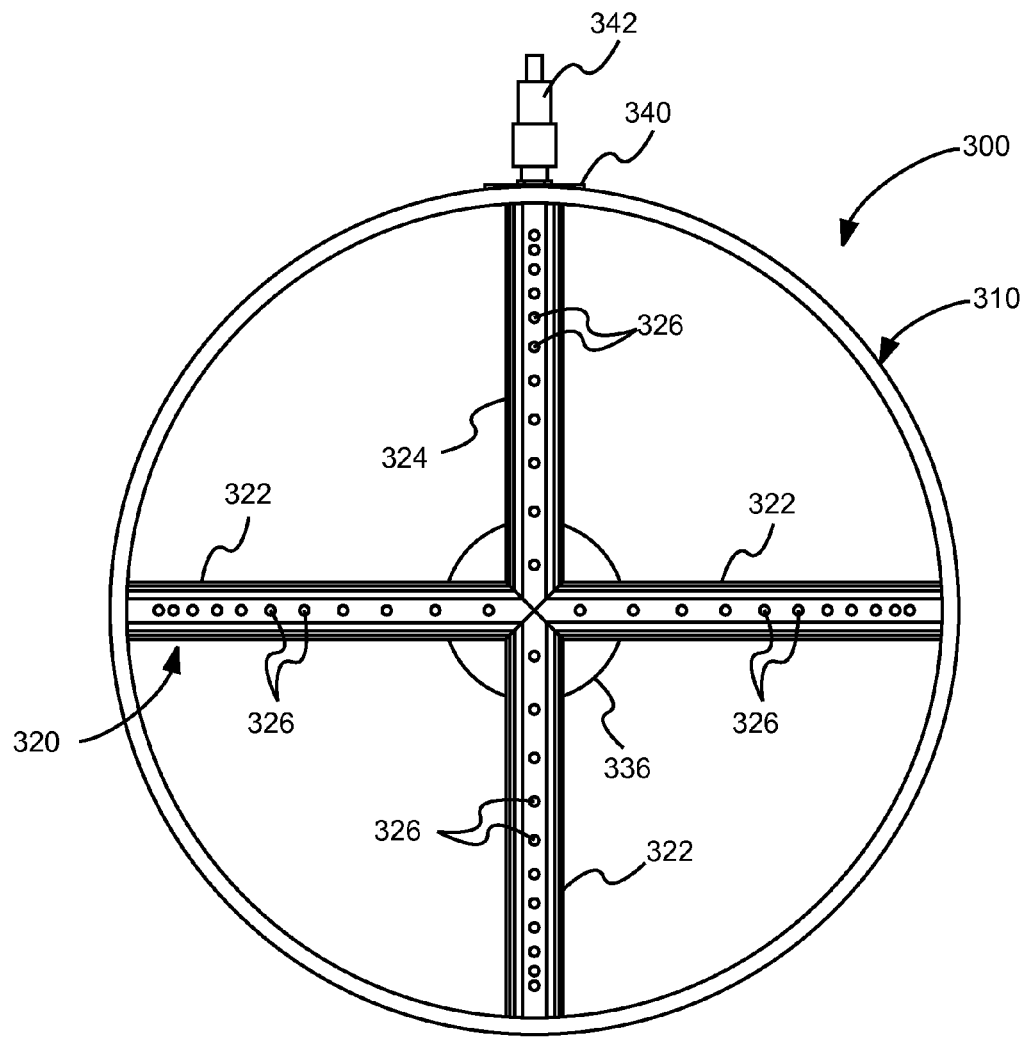
FIG. 7 is a front view of a sensor probe of a fluid sensor module with variably spaced apertures according to one embodiment.

Because the areas of the annular sections are the same, the radial width of each annular section decreases in the radially outward direction. Accordingly, in either embodiment, the distance between adjacent apertures correspondingly decreases in the radially outward direction. For example, according to one embodiment shown in FIG. 7, a sensor module 300 includes a probe 320 having arms 322 with variably-spaced and equally-sized apertures 326. The distances between the apertures 326 of the probe 420 increase in a radially inward direction. In other words, the apertures 326 are closer to each other at a radially outward portion of the arms 422 than at a radially inward portion of the arms. Additionally, to facilitate proportional sampling, aperture density (e.g., the number of apertures per unit length) can be kept high in the bottom arm of the two vertical arms of the probe (as oriented in FIG. 7), and the number of apertures in the top arm of the two vertical arms can be decreased such that the top arm has a smaller aperture density than the bottom arm. Such a configuration helps to reduce the potential over-sampling that may occur in the top arm of the vertical arms of the probe.

Figure 8:
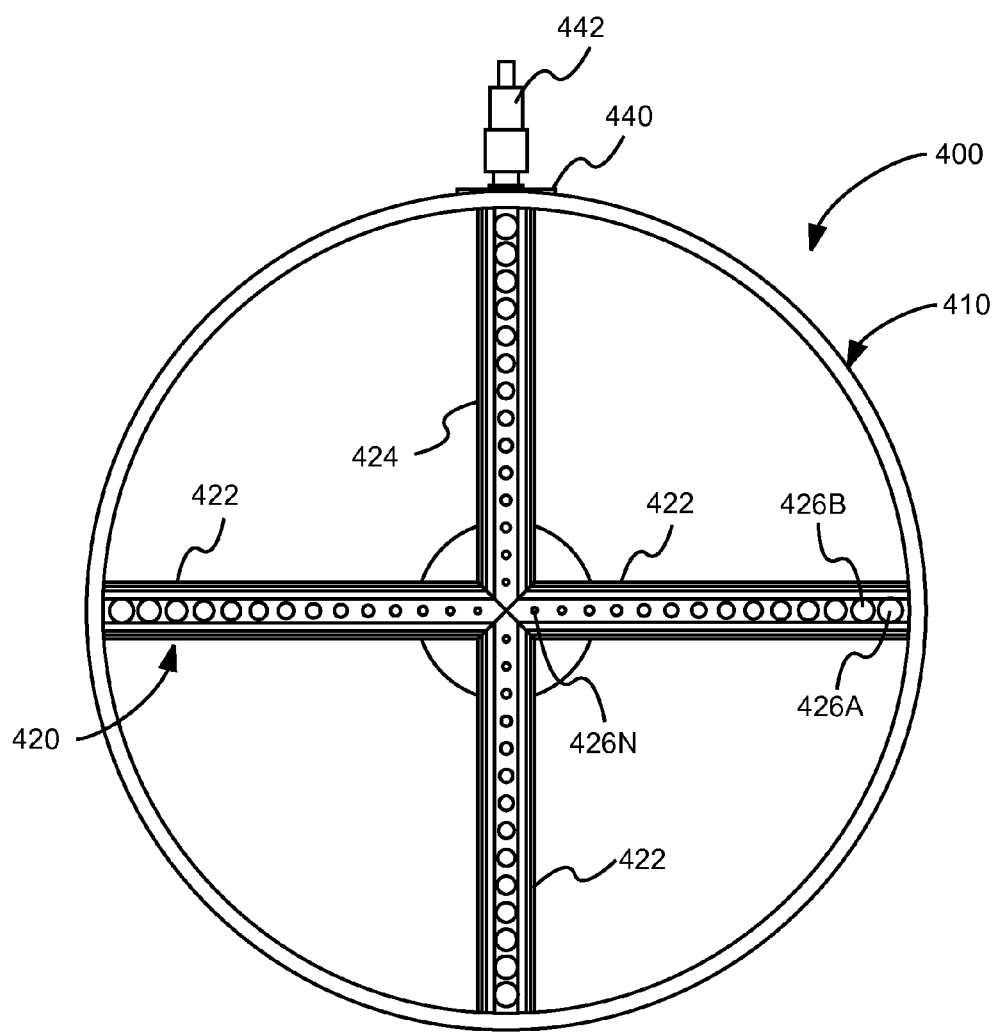
FIG. 8 is a front view of a sensor probe of a fluid sensor module with variably sized apertures according to another embodiment.

In contrast to using apertures of the same size, equal area sampling of a fluid stream can be achieved using apertures of varying sizes. For example, according to another embodiment shown in FIG. 8, a sensor module 400 includes a probe 420 having arms 422 with variably-sized and equally-spaced apertures 426. The apertures 426A-N of the probe 420 decrease in size in a radially inward direction (i.e., from aperture 426A to aperture 426N). In other words, the apertures nearer a radially outward portion of the arms 422 (e.g., apertures 426A, 426B) are larger than the apertures nearer a radially inward portion of the arms 422 (e.g., aperture 426N). Therefore, like the sensor module 300, the sensor module 400 captures more fluid at radially outward portions of the fluid stream.

Figure 9:
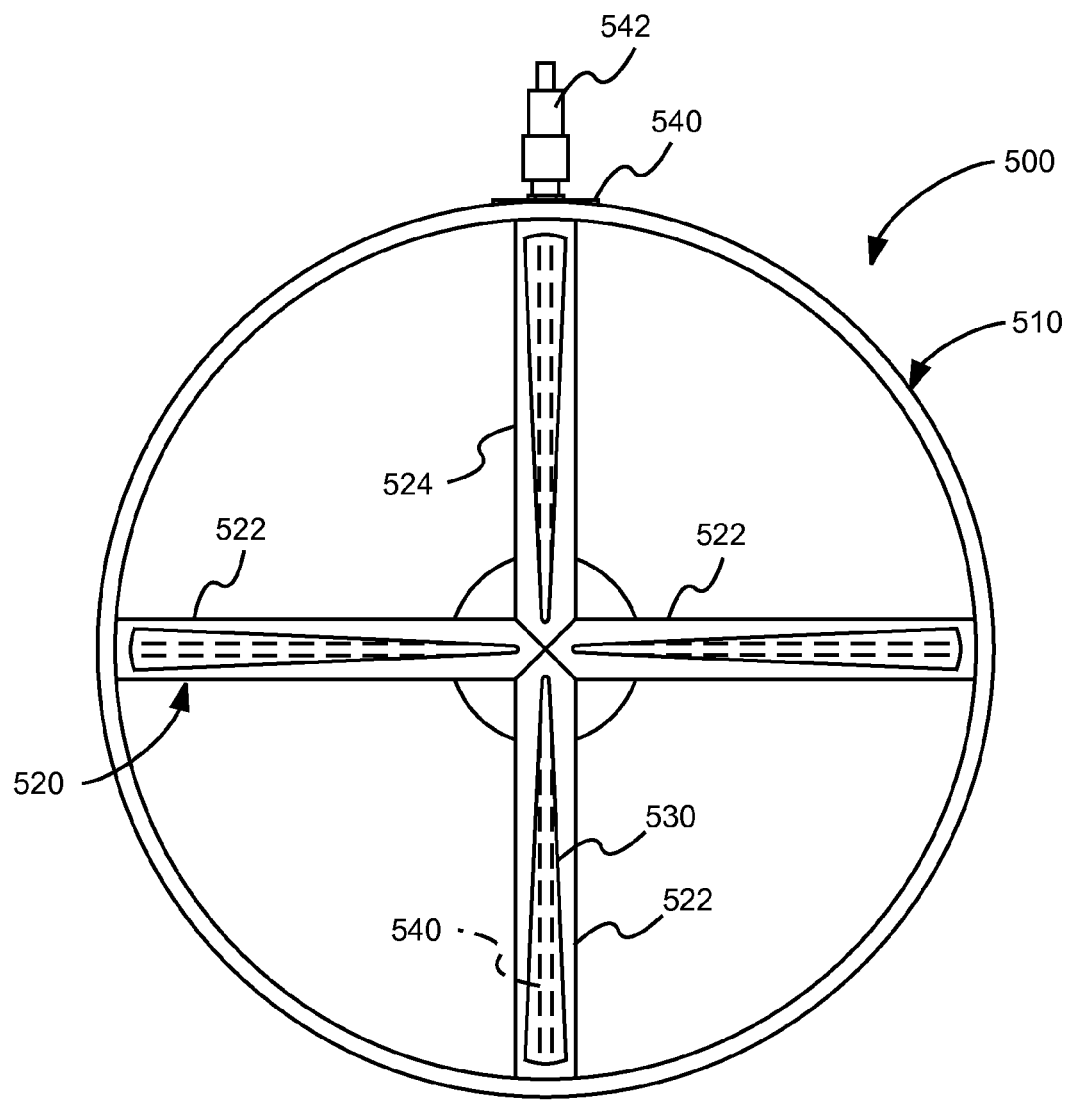
FIG. 9 is a front view of a sensor probe of a fluid sensor module with slotted apertures according to yet another embodiment.

Equal area sampling can also be achieved without using a plurality of apertures on each arm. For example, as shown in FIG. 9, a sensor module 500 includes a probe 520 having arms 522 each with a radially elongate slot 530. The illustrated slot 530 is tapered in a radially inward direction. More specifically, the width of the slot 530 decreases in the radially inward direction. Accordingly, like the sensor modules 300, 400, the sensor module 500 captures more fluid at radially outward portions of the fluid stream. Alternatively, each arm 522 can have a non-tapered slot 540 with a constant width in the radially inward direction.

The above-described embodiments of the sensor module 100 include a single extractor. However, in other embodiments, the sensor module can include multiple extractors. For example, referring to FIG. 10, a sensor module 600 includes multiple extractors 630A-D each coupled to a respective one of multiple arms 624A-D of a probe 620. Each extractor 630A-D receives fluid from the respective arm 624A-D and senses at least one characteristic of the fluid using a corresponding one of multiple sensors 642A-D. Each sensor 642A-D can sense the same fluid characteristic. However, according to one embodiment, at least one of the sensor 624A-D senses a different characteristic than the other sensors. For example, at least one of the sensors 624A-D can be an ammonia sensor and at least another of the sensors can be a $NO_x$ sensor. The readings taken from the ammonia sensor and $NO_x$ sensor can be used to determine an ammonia-to-$NO_x$ ratio, which can be used to control operation of an engine system instead of, or in addition to, ammonia and $NO_x$ concentration levels. The fluid outlet line 632A-D of each extractor 630A-D is coupled to a single diffuser cone 636, which induces a positive pressure differential for entraining exhaust gas into the arms 624A-D of the probe 620 and through the extractors 630A-D. Alternatively, each extractor 630A-D can include a respective one of multiple diffuser cones 636 each inducing a positive pressure differential across the corresponding arm and extractor.

The sensor modules associated with FIGS. 2-10 can be defined as non-bypass sensor modules. More specifically, because the extractor or extractors of the sensor modules release the sample portion of fluid into the approximately same space as the probe, the sensor modules are non-bypass sensor modules. For example, referring to the SCR system embodiment shown in FIG. 6, both the extractor and probe of the sensor module 200 are located within a space defined between two SCR catalyst beds 270, 272. The non-bypass sensor modules are able to drive fluid into the probe by virtue of a negative pressure inducing element, such as a diffuser cone. However, in some instances, the use of negative pressure inducing elements may not be desirable or feasible depending on the particular application. For example, some particular types of negative pressure inducing elements may negatively alter the pattern of fluid flowing into a downstream treatment device. Accordingly, in some embodiments, a bypass sensor module can be used.

Figure 11:
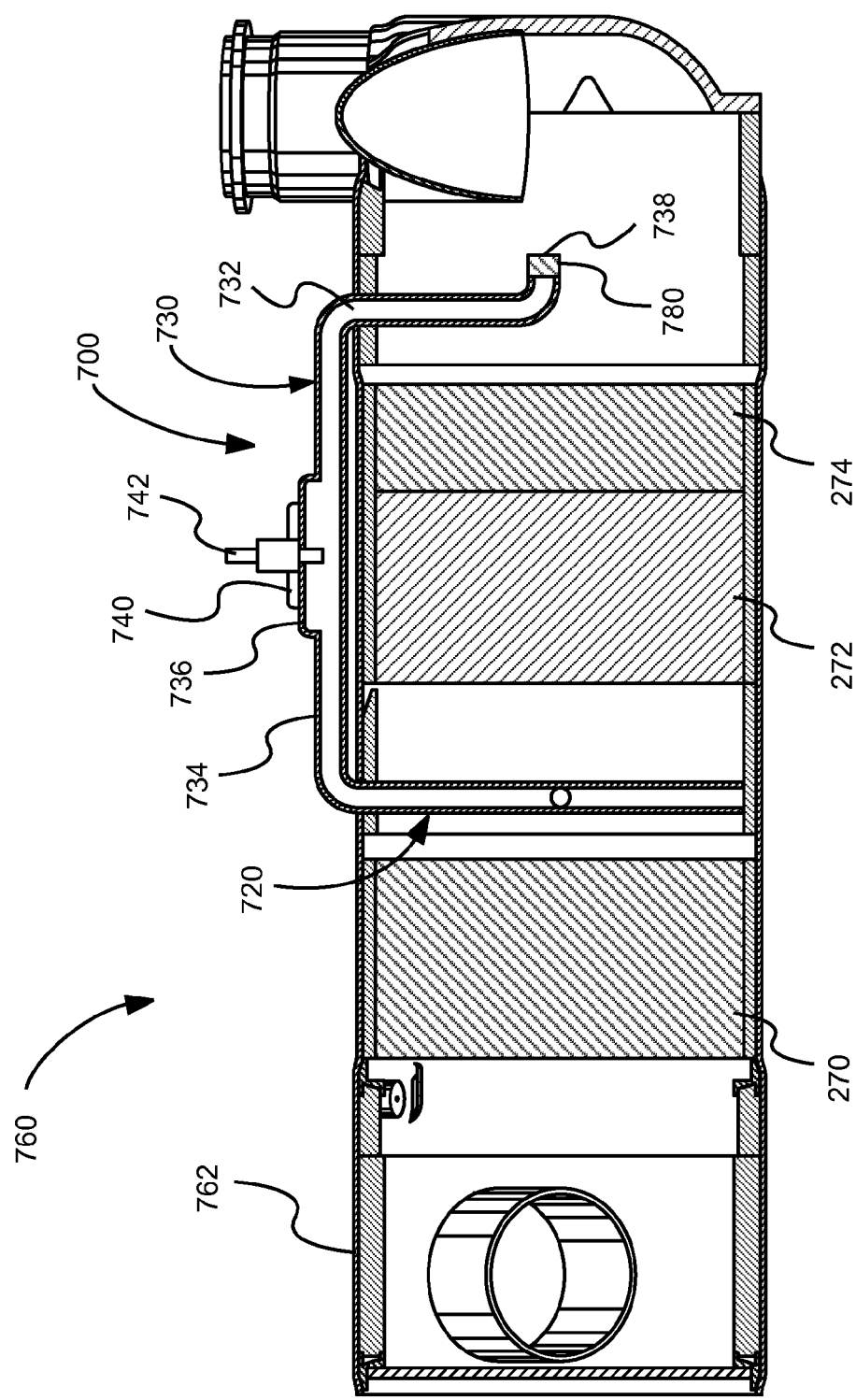
FIG. 11 is a cross-sectional side view of an SCR system having a bypass fluid sensor module according to one embodiment.

Referring to FIG. 11, a bypass sensor module 700 according to one embodiment is utilized in an SCR system 760 similar to the SCR system 260 of FIG. 6. The sensor module 700 includes a probe 720 that is configured in the same or similar manner as the probes described above. Like the sensor module 200, the sensor module 700 also includes an extractor 730 with a fluid outlet line 732 and fluid sampling line 734. However, unlike the fluid sampling line 134 of the sensor module 200, the fluid sampling line 734 does not provide a near immediate 180-degree redirection of fluid from the probe 720 to the fluid outlet line 132. Rather, the fluid sampling line 734 extends away from the probe 720 to bypass a downstream fluid treatment device (e.g., the second SCR catalyst bed 272) and place the fluid outlet line 732 at a location downstream of the downstream fluid treatment device. Such a configuration utilizes the inherent positive pressure differential created across the downstream fluid treatment device to drive fluid into the probe 720. In this manner, a passive or active negative pressure inducing feature is not required at the outlet of the fluid outlet line 732. Therefore, the potential for negatively affecting the fluid flow pattern that may be associated with a negative pressure inducing feature is reduced when using a bypass sensor module such as sensor module 700.

In some embodiments, the sensor module 700 includes a restriction device 780 coupled to the extractor 730 to adjust (e.g., optimize) the pressure differential by restricting or blocking a portion of the exhaust flowing through the extractor. The restriction device can be any of various restriction devices, such as, for example, orifice plates, perforated plates, and the like.

The fluid sampling line (i.e., bypass line) of a bypass sensor module can be configured in various ways depending on the application. As illustrated, the fluid sampling line 734 extends out of the housing 762 upstream of the downstream SCR catalyst bed 272 and runs adjacent an outer surface of the housing in an exhaust flow direction. From the fluid sampling line 734, the fluid outlet line 732 extends back into the housing downstream of the downstream SCR catalyst bed 272. As illustrated, the fluid outlet line 732 extends into the exhaust stream such that the outlet 738 of the fluid outlet line 732 expels exhaust into a central portion of the main exhaust stream generally in the exhaust flow direction. In other embodiments, however, the fluid outlet line 732 terminates at the housing wall such that the outlet of the fluid outlet line is formed in the wall to expel exhaust into a radially outward portion of the main exhaust stream. In certain implementations, a small portion of the fluid outlet line extends into the main exhaust stream to form a downstream angled outlet proximate the housing wall.

The sensor receptacle 740 and sensor 742 are located on the fluid sampling line 734 at some location between the probe 720 and fluid outlet line 732. Because the fluid pressure downstream of the downstream SCR catalyst bed 272 is lower than the fluid pressure upstream of the downstream SCR catalyst bed, a portion of the main exhaust stream is driven into the probe 720, along the fluid sampling line 734, and into the fluid outlet line 732. In alternative embodiments, the fluid sampling line 734 does not extend outside of the housing 762, but extends through the downstream SCR catalyst bed 272 and AMOX catalyst bed 274.

Figure 12:
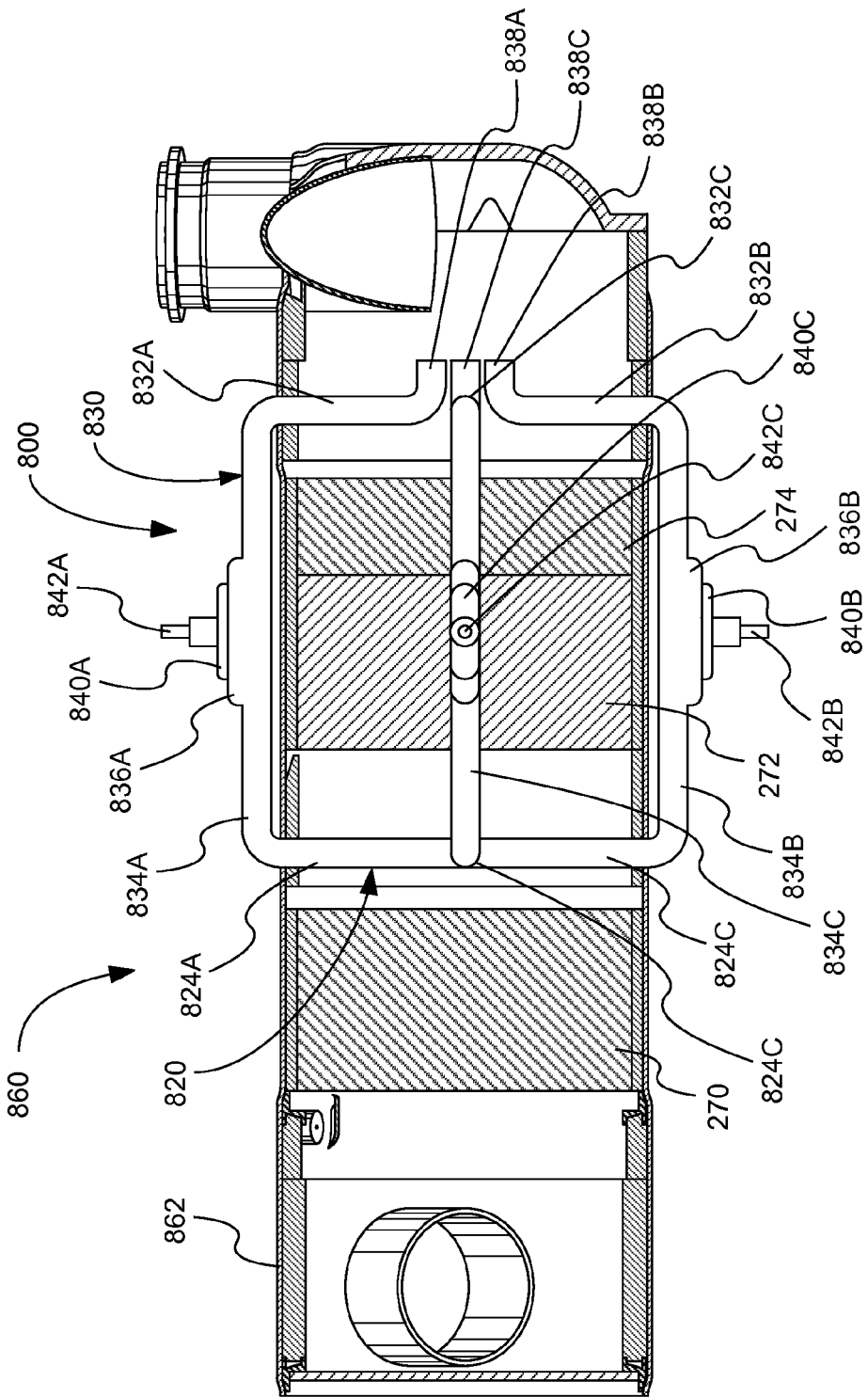
FIG. 12 is a partial cross-sectional side view of an SCR system having a bypass fluid sensor module with multiple extractors according to one embodiment.

In contrast to the bypass sensor module 700 having a single extractor 730, according to another embodiment shown in FIG. 12, a bypass sensor module 800 of the SCR system 860 has multiple extractors 830A-C. Each extractor 830A-C is coupled to a respective one of multiple arms 824A-C of a probe 820. Not shown due to visual obstruction by the arm 824C and extractor 830C is a fourth pair of an arm and extractor. Each extractor 830A-C receives fluid from the respective arm 7824A-C and senses at least one characteristic of the fluid using a corresponding one of multiple sensors 842A-C. Similar to the fluid sampling line 734 of bypass sensor module 700, each extractor 830A-C includes a respective fluid sampling line 834A-C that extends away from the probe 820 to bypass the second SCR catalyst bed 272 and to place the fluid outlet lines 832A-C within the main exhaust flow downstream of the second SCR catalyst bed. Each extractor 830A-C includes a respective sensor 842A-C for sensing a particular characteristic of fluid (e.g., exhaust) flowing through the respective fluid sampling lines 834A-C. In one embodiment, the sensors 842A-C sense the same fluid characteristic. However, in other embodiments, at least one of the sensors 842A-C senses a different characteristic than at least one other of the sensors 842A-C. The remaining features of SCR system 860 are similar to the features of SCR system 760, with like numbers referring to like features.

Figure 13:
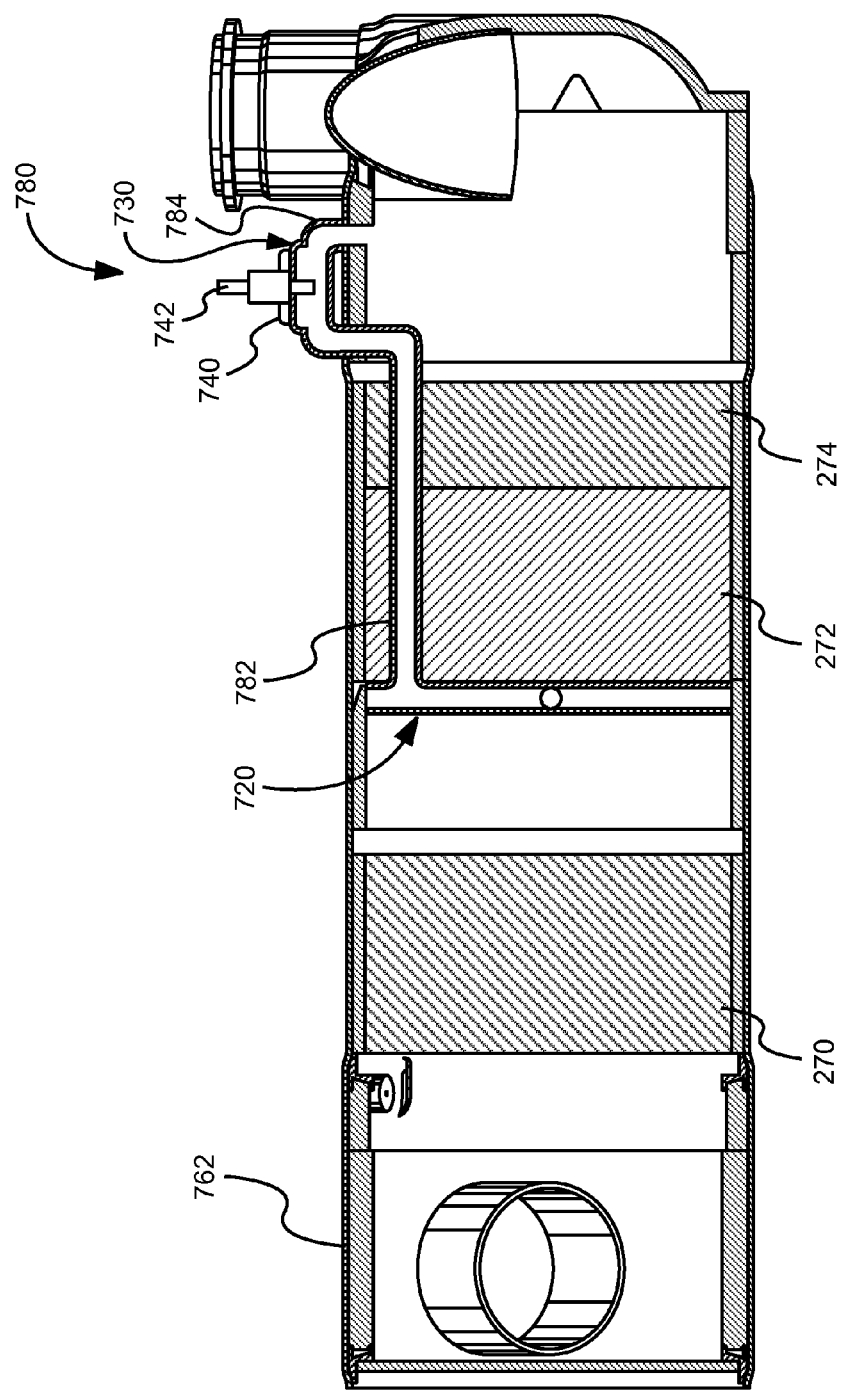
FIG. 13 is a cross-sectional side view of an SCR system having a bypass fluid sensor module according to yet another embodiment.

Another embodiment of a bypass sensor module 780 is shown in FIG. 13. The bypass sensor module 780 is similar to the bypass sensor module 700, with like numbers referring to like features. However, in contrast to the bypass sensor module 700, the fluid sampling line 782 of the bypass sensor module 780 extends through the downstream fluid treatment devices 272, 274, as opposed to extending around them as with bypass sensor module 700. The fluid sampling line 782 is defined as a longitudinal flow path that passes through one or more of the substrates of the fluid treatment devices 272, 274. In some implementations, the fluid sampling line 782 is formed of a plurality of the original flow channels of the fluid treatment devices that are dedicated to the passage of the sample portion of exhaust. In certain implementations, the plurality of original flow channels can be merged to form a single, wider flow channel dedicated to the passage of the sample portion of exhaust. In yet other implementations, the fluid sampling line 782 can be formed by drilling a passage in the substrates of the fluid treatment devices 272, 274. Like the bypass sensor module 700, the fluid sampling line 782 is fluidly coupled to the collection chamber 736, which is fluidly coupled to a fluid outlet line 784 that terminates at a wall of the housing 762. As with the bypass sensor module 700, the configuration of the bypass sensor module 780 utilizes the inherent positive pressure differential created across downstream fluid treatment devices to drive fluid into the probe 720.

Unlike the probe 720 of the bypass sensor module 700, the probe 720 of the bypass sensor module 780 is positioned in close proximity to the downstream fluid treatment device 272. In some implementations, the probe 720 of the bypass sensor module 780 is positioned in direct contact with the downstream fluid treatment device 272.

Although the sensors of the several specific implementations for exhaust treatment applications described above have been categorized as one of ammonia and $NO_x$ sensors, in other implementations, the sensors can be other types of sensors, such as, for example, hydrocarbon sensors, carbon monoxide sensors, and the like. Alternatively, in applications outside of exhaust treatment, the sensors can be any of various sensors for sensing any of various fluid flow characteristics as desired.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fluid treatment system, comprising:
   a housing defining a fluid flow channel through which fluid is flowable in a fluid flow direction from an inlet of the housing to an outlet of the housing;
   a first fluid treatment device positioned within the fluid flow channel between the inlet and outlet of the housing;
   a second fluid treatment device positioned within the fluid flow channel between the first fluid treatment device and the outlet of the housing; and
   at least one sensor module comprising:
      a sensor probe positioned within the fluid flow channel between the first and second fluid treatment devices, the sensor probe comprising a plurality of hollow arms extending radially outward from a radially inward portion of the fluid flow channel to a radially outward portion of the fluid flow channel, each of the plurality of arms comprising a plurality of apertures facing a direction substantially opposite the fluid flow direction, the apertures being communicable in fluid receiving communication with a sample portion of fluid flowing through the fluid flow channel,
      at least one sensor communicable in sensing communication with fluid received through the apertures, and
      an extractor portion coupled to the sensor probe, the extractor portion comprising the sensor and the extractor portion being communicable in fluid receiving communication with the plurality of hollow arms of the sensor probe, and wherein the extractor portion comprises an outlet positioned between the second fluid treatment device and the outlet of the housing, the outlet of the extractor portion being communicable in fluid supplying communication with fluid flowing through the fluid flow channel of the housing, wherein the extractor portion comprises a bypass line extending about the second fluid treatment device, the bypass line fluidly coupling the sensor probe and the outlet of the extractor portion.

2. The fluid treatment system of claim 1, wherein fluid received through the apertures of at least one of the plurality of hollow arms flows through the at least one hollow arm and combines with fluid received through the apertures of and flowing through at least another of the plurality of hollow arms, the at least one sensor being communicable in sensing communication with the combined fluid flowing through the at least another of the plurality of hollow arms.

3. The fluid treatment system of claim 1, wherein the plurality of apertures of each of the hollow arms are aligned along the respective hollow arm from a radially innermost portion of the hollow arm to a radially outermost portion of the hollow arm.

4. The fluid treatment system of claim 1, wherein the at least one sensor module comprises a first sensor module, the fluid treatment system comprising a second sensor module comprising a sensor probe positioned within the fluid flow channel between the second fluid treatment device and the outlet of the housing, the sensor probe of the second sensor module comprising a plurality of hollow arms extending radially outward from a radially inward portion of the fluid flow channel to a radially outward portion of the fluid flow channel, each of the plurality of arms comprising a plurality of apertures facing a direction substantially opposite the fluid flow direction, the apertures being communicable in fluid receiving communication with a sample portion of fluid flowing through the fluid flow channel, wherein the second sensor module further comprises at least one sensor communicable in sensing communication with fluid received through the apertures of the hollow arms of the second sensor module.

5. The fluid treatment system of claim 4, wherein the first fluid treatment device comprises a first portion of a selective catalytic reduction (SCR) catalyst and the second fluid treatment device comprises a second portion of the SCR catalyst, the fluid comprising an exhaust gas generated by an internal combustion engine.

6. The fluid treatment system of claim 5, wherein the at least one sensor of the first sensor module senses an ammonia concentration in the exhaust gas received through the apertures of the sensor probe of the first sensor module, and the at least one sensor of the second sensor module senses a nitrogen-oxide concentration in the exhaust gas received through the apertures of the sensor probe of the second sensor module.

7. The fluid treatment system of claim 5, further comprising an engine control unit operable to control operations of the internal combustion engine, wherein the sensor is communicable in electronic communication with an engine control unit to forward at least one characteristic of the fluid flowing between the first and second fluid treatment devices for facilitating closed-loop feedback control of the internal combustion engine.

8. A fluid treatment system, comprising:
   a housing defining a fluid flow channel through which fluid is flowable in a fluid flow direction from an inlet of the housing to an outlet of the housing;
   a first fluid treatment device positioned within the fluid flow channel between the inlet and outlet of the housing;
   a second fluid treatment device positioned within the fluid flow channel between the first fluid treatment device and the outlet of the housing; and
   at least one sensor module comprising:
      a sensor probe positioned within the fluid flow channel between the first and second fluid treatment devices, the sensor probe comprising a plurality of hollow arms extending radially outward from a radially inward portion of the fluid flow channel to a radially outward portion of the fluid flow channel, each of the plurality of arms comprising a plurality of apertures facing a direction substantially opposite the fluid flow direction, the apertures being communicable in fluid receiving communication with a sample portion of fluid flowing through the fluid flow channel, at least one sensor communicable in sensing communication with fluid received through the apertures, and an extractor portion coupled to the sensor probe, the extractor portion comprising the sensor and the extractor portion being communicable in fluid receiving communication with the plurality of hollow arms of the sensor probe, and wherein the extractor portion comprises an outlet positioned between the second fluid treatment device and the outlet of the housing, the outlet of the extractor portion being communicable in fluid supplying communication with fluid flowing through the fluid flow channel of the housing, wherein the extractor portion comprises a bypass line extending through the second fluid treatment device, the bypass line fluidly coupling the sensor probe and the outlet of the extractor portion.

9. The fluid treatment system of claim 1, wherein the at least one sensor module comprises an extractor portion coupled to the sensor probe, the extractor portion comprising the sensor and the extractor portion being communicable in fluid receiving communication with the plurality of hollow arms of the sensor probe, wherein the extractor portion comprises an outlet in fluid supplying communication with fluid flowing through the fluid flow channel of the housing, and wherein the extractor portion comprises a pressure regulating element that facilitates a fluid pressure at the outlet of the extractor portion that is lower than a fluid pressure at the plurality of apertures of the plurality of arms.

10. A method for sensing characteristics of a fluid flowing through a fluid conduit, comprising:

positioning a sensor module at least partially within the fluid conduit, the sensor module comprising a plurality of hollow arms each having a plurality of racially-aligned apertures collectively defining an inlet of the sensor module and at least one fluid extractor coupled to the plurality of arms, the at least one fluid extractor comprising an outlet of the sensor module, the inlet positioned between a first fluid treatment device and a second fluid treatment device, the outlet of the at least one fluid extractor positioned between the second fluid treatment device and an outlet of the fluid conduit, the outlet of the at least one fluid extractor being communicable in fluid supplying communication with fluid flowing through the plurality of hollow arms, the at least one fluid extractor further comprising a bypass line extending about the second fluid treatment device, the bypass line fluidly coupling a sensor probe and the outlet of the sensor module;

creating a pressure differential between the inlet and outlet of the sensor module;

entraining a portion of the fluid flowing through the fluid conduit into the plurality of apertures, through the plurality of hollow arms, and through the at least one fluid extractor via the created pressure differential; and sensing at least one characteristic of the portion of fluid flowing through the at least one fluid extractor using the sensor probe.

11. The method of claim 9, wherein entraining a portion of the fluid flowing through the fluid conduit and through the plurality of hollow arms comprises combining fluid flow through all but one of the plurality of arms into the one of the plurality of arms, the method further comprising directing the combined fluid flow through the one of the plurality of arms into the at least one fluid extractor.

* * * * *

UNITED STATES PATENT AND TRADEMARK OFFICE
CERTIFICATE OF CORRECTION

| | | |
|---|---|---|
| PATENT NO. | : 8,756,913 B2 | Page 1 of 1 |
| APPLICATION NO. | : 13/007342 | |
| DATED | : June 24, 2014 | |
| INVENTOR(S) | : Z. Gerald Liu et al. | |

It is certified that error appears in the above-identified patent and that said Letters Patent is hereby corrected as shown below:

In the Claims:

Claim 10, Column 19, Line 33-Column 20, Line 1, "racially-aligned" should be -- radially-aligned --

Signed and Sealed this
Fourth Day of November, 2014

Michelle K. Lee
*Deputy Director of the United States Patent and Trademark Office*